United States Patent
Ostrovsky et al.

(10) Patent No.: US 8,266,172 B2
(45) Date of Patent: Sep. 11, 2012

(54) DATA PARALLEL QUERY ANALYSIS

(75) Inventors: Igor Ostrovsky, Bellevue, WA (US); John Duffy, Renton, WA (US); Mike Liddell, Seattle, WA (US); Edward G. Essey, Seattle, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 12/418,136

(22) Filed: Apr. 3, 2009

(65) Prior Publication Data
US 2010/0257191 A1 Oct. 7, 2010

(51) Int. Cl.
*G06F 7/00* (2006.01)

(52) U.S. Cl. ......... 707/771; 707/764

(58) Field of Classification Search ........ 707/999.002, 707/764, 771
See application file for complete search history.

(56) References Cited

U.S. PATENT DOCUMENTS

| | | | |
|---|---|---|---|
| 6,092,062 A * | 7/2000 | Lohman et al. ......... | 1/1 |
| 6,138,123 A * | 10/2000 | Rathbun .............. | 1/1 |
| 6,289,334 B1 * | 9/2001 | Reiner et al. .......... | 1/1 |
| 6,311,265 B1 * | 10/2001 | Beckerle et al. ........ | 712/203 |
| 6,327,587 B1 * | 12/2001 | Forster ............... | 1/1 |
| 6,529,913 B1 * | 3/2003 | Doig et al. ........... | 707/999.101 |
| 6,732,084 B1 * | 5/2004 | Kabra et al. .......... | 1/1 |
| 7,321,891 B1 * | 1/2008 | Ghazal ................ | 1/1 |
| 7,571,160 B2 * | 8/2009 | Riccardi et al. ........ | 1/1 |
| 7,577,647 B2 * | 8/2009 | Graefe et al. ......... | 1/1 |
| 7,761,477 B1 * | 7/2010 | Luo et al. ............ | 707/803 |
| 2002/0063713 A1 * | 5/2002 | Sowizral et al. ....... | 345/440 |
| 2002/0083049 A1 * | 6/2002 | Forster et al. ......... | 707/3 |
| 2005/0149492 A1 * | 7/2005 | Galindo-Legaria et al. | 707/2 |
| 2006/0101001 A1 * | 5/2006 | Lindsay et al. ........ | 707/3 |
| 2006/0218123 A1 | 9/2006 | Chowdhuri et al. | |
| 2007/0073643 A1 * | 3/2007 | Ghosh et al. .......... | 707/2 |
| 2007/0079303 A1 | 4/2007 | Du et al. | |
| 2007/0244876 A1 * | 10/2007 | Jin et al. ............. | 707/5 |
| 2007/0250470 A1 * | 10/2007 | Duffy et al. .......... | 707/2 |
| 2008/0034357 A1 | 2/2008 | Gschwind | |
| 2008/0134158 A1 * | 6/2008 | Salz et al. ........... | 717/148 |
| 2008/0147599 A1 * | 6/2008 | Young-Lai ............ | 707/2 |
| 2008/0147627 A1 | 6/2008 | Natkovich et al. | |
| 2008/0162409 A1 | 7/2008 | Meijer et al. | |
| 2008/0189277 A1 * | 8/2008 | Meijer et al. ......... | 707/6 |
| 2009/0018989 A1 * | 1/2009 | Chang et al. ......... | 707/2 |
| 2009/0132503 A1 * | 5/2009 | Sun et al. ............ | 707/4 |
| 2009/0234801 A1 * | 9/2009 | Moor et al. .......... | 707/2 |

OTHER PUBLICATIONS

Spiliopoulou et al., "Parallel Optimization of Large Join Queries with Set Operators and Aggregates in a Parallel Environment Supporting Pipeline", IEEE Transactions on Knowledge and Data Engineering, vol. 8, No. 3, Jun. 1996, pp. 429-445.*

Su et al., "Performance Analysis of Parallel Query Processing Algorithms for Object-Oriented Databases", IEEE Transaction on Knowledge and Data Engineering, vol. 12, No. 6, Nov./Dec. 2000, pp. 979-997.*

Duffy, et al., "Parallel LINQ Running Queries on Multi-Core Processors", retrieved at <<http://msdn.microsoft.com/en-us/magazine/cc163329.aspx>>, Jan. 14, 2009, pp. 9.

(Continued)

*Primary Examiner* — Phuong Thao Cao

(57) ABSTRACT

A method of analyzing a data parallel query includes receiving a user-specified data parallel query that includes a plurality of query operators. An operator type for each of the query operators is identified based on a type of parallel input data structure the operator operates on and a type of parallel output data structure the operator outputs. It is determined whether the query is a prohibited query based on the identified operator types.

19 Claims, 6 Drawing Sheets

OTHER PUBLICATIONS

"Welcome to ScaleOut StateServer Distributed Data Caching for Server Farms", retrieved at <<http://www.scaleoutsoftware.com/support/stateServer/soss_help/introduction/welcome.htm>>, Jan. 14, 2009, pp. 4.

Blelloch, et al., "Implementation of a Portable Nested Data-Parallel Language", retrieved at <<http://www.cs.cmu.edu/~jch/publications/CMU-CS-93-112.pdf>>, Feb. 1993, pp. 3.

"Declaring Parallel Arrays", retrieved at <<http://docs.sun.com/app/docs/doc/805-6275-10/6j5tr68ce?a=view>>, Jan. 14, 2009, pp. 13.

"Maximizing Advantage from Microsoft SQL Server 2008", retrieved at <<http://www.intelalliance.com/microsoft/assets/SQLServer2008TechWhitePaper.pdf>>, Technical White Paper, pp. 1-8.

Ben-Asher, et al., "The .NET Implementation of a Parallel Query Engine", retrieved at <<http://cs.haifa.ac.il/~yosi/PDB2.pdf>>, pp. 9.

"Objectivity Launches Distributed, Parallel Query Engine". retrieved at <<http://www.hpcwire.com/offthewire/17882999.html>>, Jan. 14, 2009, pp. 15.

"PLINQ", retrieved at <<http://www.danielmoth.com/Blog/2009/01/pling.html>>, Jan. 25, 2009; pp. 2.

\* cited by examiner

DATA PARALLEL QUERY ANALYSIS

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Data parallelism is a programming pattern where an operation is applied to input data, and the work is distributed across multiple computational cores by assigning different input elements to be processed by different cores. As a result of spreading the computation across multiple computational cores, the time to complete the computation is reduced. Since a motivation for parallelism is improved performance, one embodiment identifies queries that will not be executed efficiently in parallel, and prevents them from being compiled.

One embodiment provides a method of analyzing a data parallel query, which includes receiving a user-specified data parallel query that includes a plurality of query operators. An operator type for each of the query operators is identified based on a type of parallel input data structure the operator operates on and a type of parallel output data structure the operator outputs. It is determined whether the query is a prohibited query based on the identified operator types.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
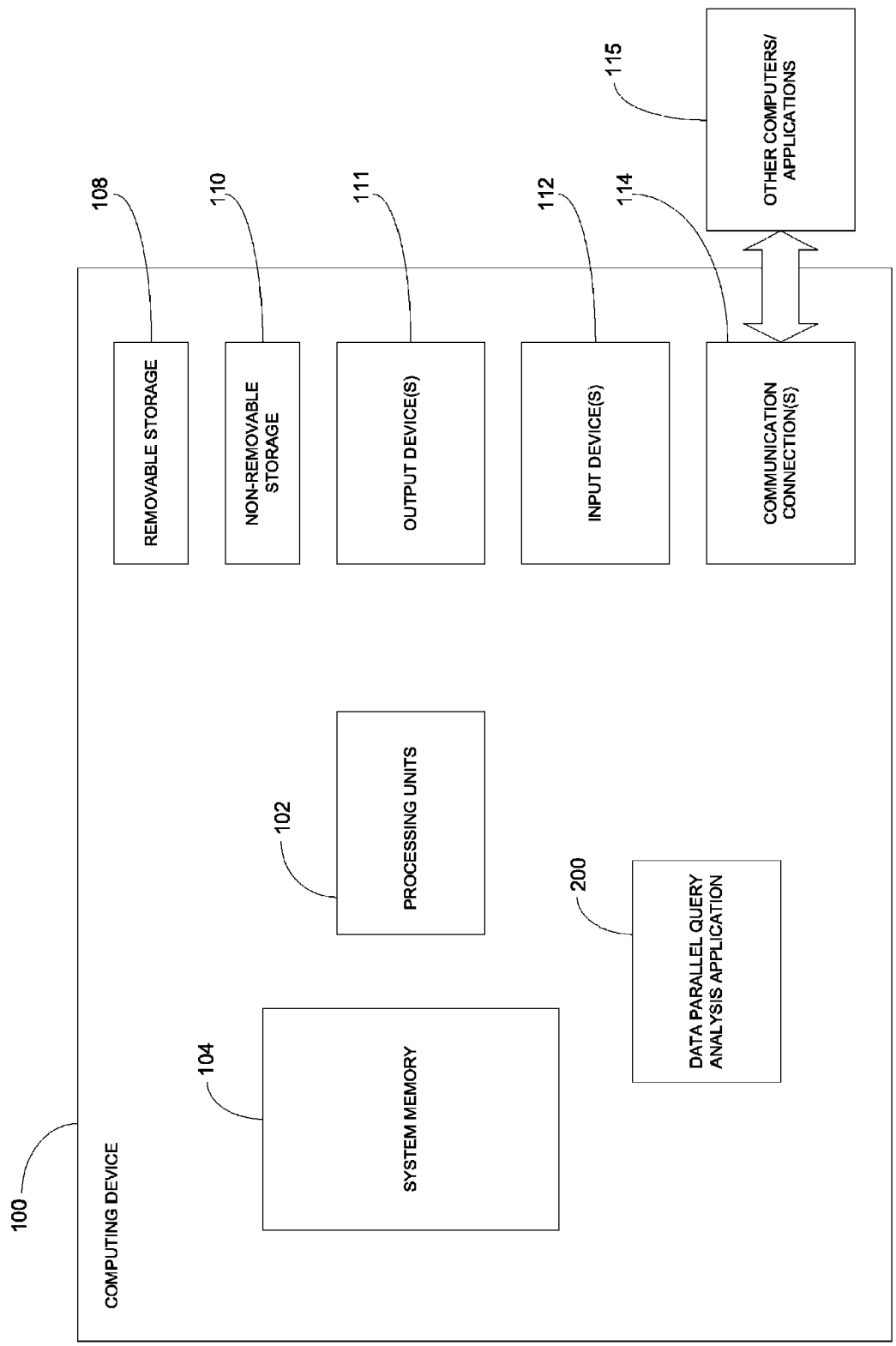
FIG. 1 is a diagram illustrating a computing system suitable for analyzing a data parallel query according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a data parallel query analysis application, but the technologies and techniques described herein also serve other purposes in addition to these. In one implementation, one or more of the techniques described herein can be implemented as features within a framework program such as Microsoft® .NET Framework, or within any other type of program or service.

A query may be constructed by a developer using a predefined query language. The developer then typically uses a compiler tool to translate the query into code that calls appropriate library functions to execute the query. One type of query is a language integrated query. In one embodiment, the queries analyzed by the data parallel query analysis application are language integrated queries. A language integrated query according to one embodiment is a query that is an integrated feature of a developer's primary programming language (e.g., C#, Visual Basic). Language integrated queries according to one embodiment allow query expressions to benefit from rich metadata, compile-time syntax checking, and static typing that was previously available only to program code written in a statically type-checked language, and specifically not queries that are customarily embedded into such programs as untyped strings. As an example, Microsoft® supports the LINQ (Language Integrated Query) programming model, which is a set of patterns and technologies that allow the user to describe a query that will execute on a variety of different execution engines. LINQ provides .NET developers with the ability to query and transform data sequences using any of a variety of .NET programming languages.

In one embodiment, a developer describes a query using a convenient query syntax that consists of a variety of query operators such as projections, filters, aggregations, and so forth. The operators themselves may contain one or more expressions or expression parameters. For example, a "Where" operator will contain a filter expression that will determine which elements should pass the filter. An expression according to one embodiment is a combination of letters, numbers, and symbols used to represent a computation that produces a value. The operators together with the expressions provide a complete description of the query.

In one embodiment, the queries analyzed by the data parallel query analysis application are data parallel language integrated queries that are configured to be executed in a parallel manner. Data parallelism is a programming pattern where an operation is applied to input data, and the work is distributed across multiple computational cores by assigning different input elements to be processed by different cores. As a result of spreading the computation across multiple computational cores, the time to complete the computation is reduced.

Writing data-parallel programs from scratch is a nontrivial programming problem, and can be simplified by building the solution on top of an existing data-parallel library. The library will provide various operators (e.g., projections, filters, joins, reductions, etc.) that the developer can combine to build data-parallel queries. Parallel LINQ (PLINQ) from Microsoft® is one such library. PLINQ accepts language integrated queries and automatically uses multiple processors or cores for execution when they are available. The following Pseudo Code Example I gives an example of a PLINQ query that negates the elements from the array, arr, takes the first 1,000 of them, keeps only those that are divisible by 3, and dumps the results into an array:

PSEUDO CODE EXAMPLE I

```
int[ ] arr = ...
arr.AsParallel( )
    .Select(x => -x)
    .Take(1000)
    .Where(x => x%3 == 0)
    .ToArray( );
```

Since a motivation for parallelism is improved performance, one embodiment identifies queries that will not be executed efficiently in parallel, and prevents them from being compiled. Some operator sequences may be efficient, but other sequences may not. One embodiment defines two kinds of parallel computations: parallel arrays and parallel sequences. In one embodiment, some operators can be applied to parallel arrays, but not parallel sequences. That way, more operators can be supported than a system based solely on parallel arrays or parallel sequences, and queries are limited in one embodiment to those that can be executed efficiently. One embodiment provides data parallel array and data parallel sequence application programming interfaces (APIs) with static enforcement of usage patterns. In one embodiment, the APIs use types (e.g., query operator types) to statically enforce efficient usage patterns. One embodiment provides a parallel query API based on a combination of parallel sequences and parallel arrays. In one embodiment, the parallel query API allows queries that are determined to be efficient, does not allow queries that are determined to be inefficient, and supports a large number of operators.

FIG. 1 is a diagram illustrating a computing device 100 suitable for analyzing a data parallel query according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions for performing a method). Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a data parallel query analysis application 200. Data parallel query analysis application 200 is described in further detail below with reference to FIG. 2.

Figure 2:
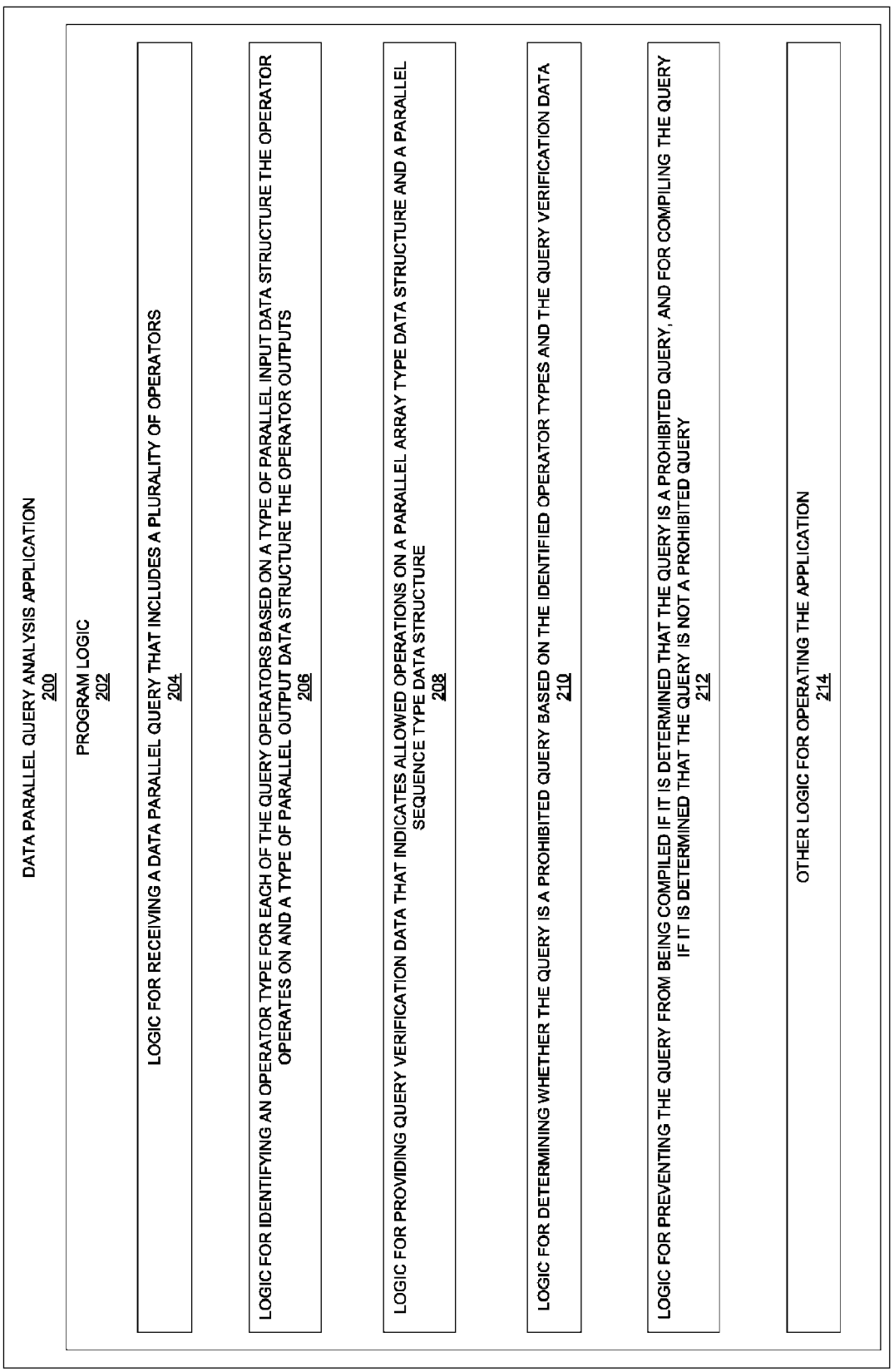
FIG. 2 is a diagrammatic view of a data parallel query analysis application for operation on the computer system illustrated in FIG. 1 according to one embodiment.

FIG. 2 is a diagrammatic view of a data parallel query analysis application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Data parallel query analysis application 200 includes program logic 202, which is responsible for carrying out some or all of the techniques described herein. Program logic 202 includes logic 204 for receiving a data parallel query that includes a plurality of operators; logic 206 for identifying an operator type for each of the query operators based on a type of parallel input data structure the operator operates on and a type of parallel output data structure the operator outputs; logic 208 for providing query verification data that indicates allowed operations on a parallel array type data structure and a parallel sequence type data structure; logic 210 for determining whether the query is a prohibited query based on the identified operator types and the query verification data; logic 212 for preventing the query from being compiled if it is determined that the query is a prohibited query, and for compiling the query if it is determined that the query is not a prohibited query; and other logic 214 for operating the application.

Turning now to FIGS. 3-6, techniques for implementing one or more embodiments of data parallel query analysis application 200 are described in further detail. In some implementations, the techniques illustrated in FIGS. 3-6 are at least partially implemented in the operating logic of computing device 100.

Figure 3:
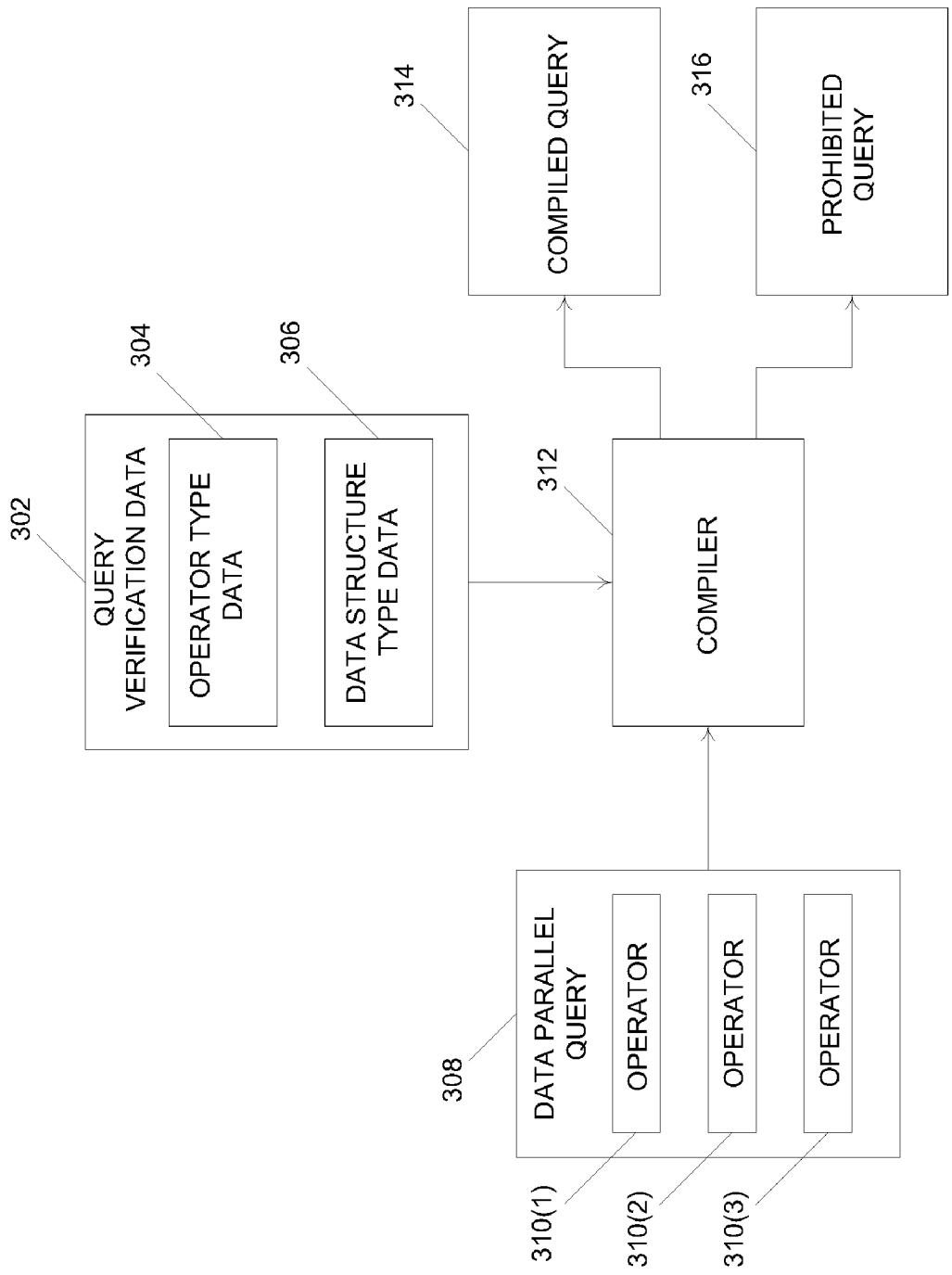
FIG. 3 is a block diagram illustrating the analysis of a data parallel query according to one embodiment.

FIG. 3 is a block diagram illustrating the analysis of a data parallel query according to one embodiment. As shown in FIG. 3, a data parallel query 308, which includes a plurality of query operators 310(1)-310(3) (collectively referred to as query operators 310), is provided to compiler 312 for analysis. Query verification data 302 is also provided to compiler 312 to assist in the analysis of query 308. In the illustrated embodiment, query verification data 302 includes operator type data 304, and data structure type data 306. Query verification data 302 is described in further detail below with reference to FIG. 4. Based on the query verification data 302, compiler 312 analyzes query 308 and determines whether query 308 is an allowed query or a prohibited query. If compiler 312 determines that query 308 is an allowed query, compiler 312 compiles the query 308 and outputs a compiled query 314. If compiler 312 determines that query 308 is a prohibited query, compiler 312 outputs an indication 316 that the query 308 is a prohibited query, and prevents the query 308 from being compiled.

Figure 4:
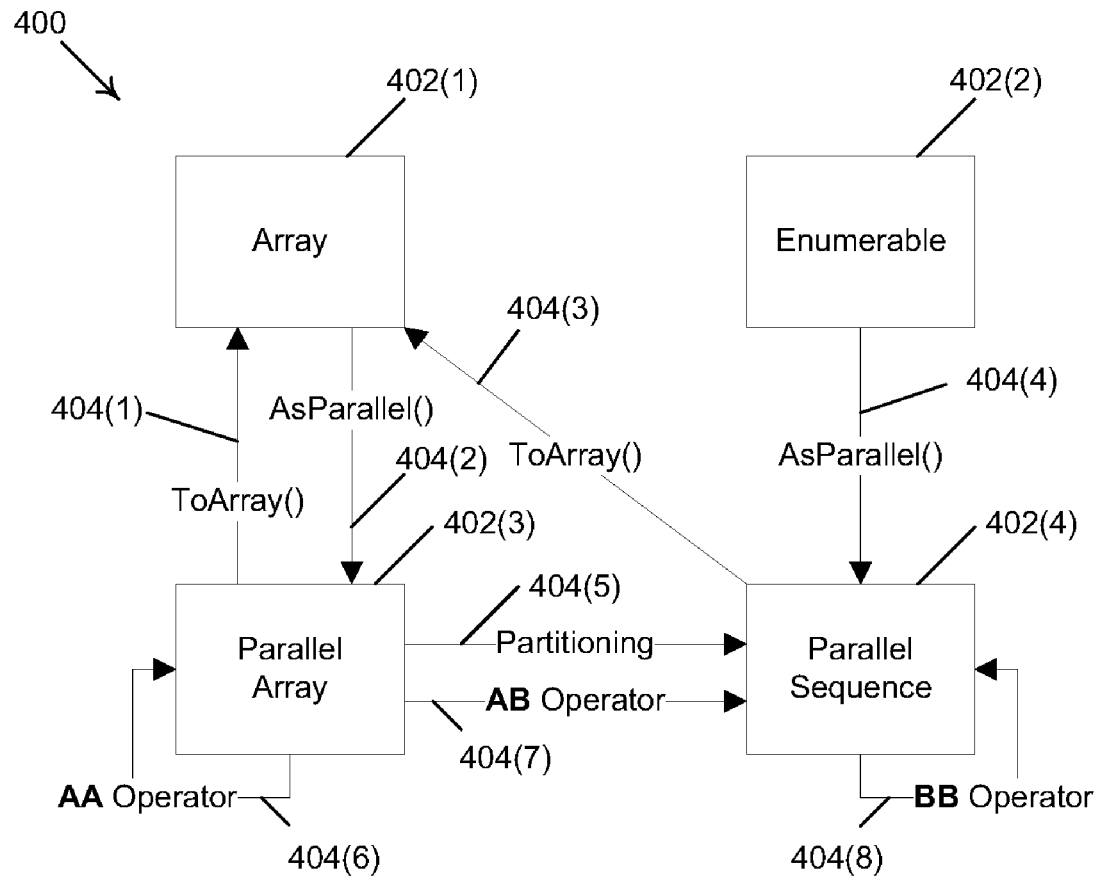
FIG. 4 is a state diagram for use in analyzing a data parallel query according to one embodiment.

FIG. 4 is a state diagram 400 for use in analyzing a data parallel query 308 according to one embodiment. In one embodiment, state diagram 400 is part of the query verification data 302 (FIG. 3), and is used by compiler 312 to determine whether a given query 308 is an allowed query or a prohibited query. As shown in FIG. 4, the state diagram 400 includes nodes 402(1)-402(4) (collectively referred to as nodes 402), and transitions 404(1)-404(8) (collectively referred to as transitions 404) between the nodes 402. In one embodiment, nodes 402 correspond to the data structure type data 306 (FIG. 3), and each node 402 represents a particular data structure type. In the illustrated embodiment, nodes 402(1) and 402(2) represent sequential data structure types, and nodes 402(3) and 402(4) represent parallel data structure types. Specifically, node 402(1) represents an array; node 402(2) represents an enumerable; node 402(3) represents a parallel array; and node 402(4) represents a parallel sequence.

In one embodiment, transitions 404 represent allowed transitions between nodes 402, and the absence of a transition 404 indicates that such a transition is not allowed. As indicated by transition 404(1), a parallel array 402(3) can be converted to an array 402(1) by using a ToArray( ) method. As indicated by transition 404(2), an array 402(1) can be converted to a parallel array 402(3) by using an AsParallel( ) method. As indicated by transition 404(3), a parallel sequence 402(4) can be converted to an array 402(1) by using the ToArray( ) method. As indicated by transition 404(4), an enumerable 402(2) can be converted to a parallel sequence 402(4) by using the AsParallel method. As indicated by transition 404(5), a parallel array 402(3) can be converted to a parallel sequence 402(4) by performing a partitioning operation. As indicated by transition 404(6), an "AA" type operator receives a parallel array 402(3) as an input and generates a parallel array 402(3) as an output. As indicated by transition 404(7), an "AB" type operator receives a parallel array 402(3) as an input and generates a parallel sequence 402(4) as an output. As indicated by transition 404(8), a "BB" type operator receives a parallel sequence 402(4) as an input and generates a parallel sequence 402(4) as an output. In the illustrated embodiment, the operator transitions 404(6)-404(8) correspond to the operator type data 304 (FIG. 3).

As shown in FIG. 4, the state diagram 400 includes two parallel data structures: a parallel array 402(3) and a parallel sequence 402(4). These data structures will now be described in further detail, beginning with parallel sequences. One way to implement a parallel sequence 402(4) is with a set of enumerators. An enumerator is used to sequentially "walk" through a sequence. In one embodiment, each enumerator for a parallel sequence 402(4) is an object that supports two methods: GetCurrent( ) and MoveNext( ). GetCurrent( ) returns the element that the enumerator is currently positioned at, and MoveNext( ) moves the enumerator to the next element in the sequence, returning false if the end of the sequence is reached. Advancing each enumerator computes one output element. Different enumerators for a given parallel sequence 402(4) can be advanced by different computational threads, thus distributing the work onto multiple computational cores.

In one embodiment, a parallel sequence 402(4) is implemented as a class that implements an IParallelSequence<T> interface, as shown in the following Pseudo Code Example II:

PSEUDO CODE EXAMPLE II

```
public interface IParallelSequence<T>
{
    IEnumerator<T>[ ] GetPartitions( );
}
```

To execute a parallel computation on a parallel sequence 402(4), the method GetPartitions( ) in Example II is called to obtain a plurality of partitions, and then each partition is processed by a separate enumerator on a separate thread. Additional operations can also be applied to the output of this data parallel computation. This can be done by wrapping each enumerator with another enumerator that applies some operation to the partition. In this manner, another parallel sequence 402(4) is generated, to which further parallel operations can be applied.

For an example, consider the PLINQ query given in the following Pseudo Code Example III:

PSEUDO CODE EXAMPLE III

```
IEnumerable<int> src = ...
int[ ] result = src.AsParallel( )
    .Where(x => x%2 == 0)
    .Select(x => Foo(x))
    .ToArray( )
```

The code in Example III according to one embodiment behaves as follows. AsParallel( ) converts the source array, src, to a parallel sequence 402(4), which includes a number of partitions (e.g., equal to the number of computational cores available). The Where( ) operator wraps each partition with an enumerator that filters out odd integers, and returns a parallel sequence 402(4) that contains the wrapped partitions. The Select( ) operator wraps each partition returned by the Where( ) operator with an enumerator that computes Foo(x) for each element, and also returns a parallel sequence 402(4). The ToArray( ) operator takes the parallel sequence 402(4) returned by the Select( ) operator, and walks over each partition on a different thread. Walking each enumerator performs the computation, so by walking over different partitions with different threads, the computation is parallelized.

In contrast to the parallel sequence 402(4), a parallel array 402(3) according to one embodiment has two properties: (1) it is known ahead of time how many elements the output will contain; and (2) any particular output element can be computed without having to compute all elements that come before it. For example, the fifth element of the output can be computed without computing the first four elements. These two properties may rule out some operations, such as filtering using a user-provided predicate. When filtering, it may not be known how many elements there will be in the output until the predicate is applied to each of the input elements. Similarly, before being able to compute the i-th element of the output, the first i elements that pass the filter will first be found.

In one embodiment, a parallel array 402(3) is implemented as a class that implements the IParallelArray<T> interface, as shown in the following Pseudo Code Example IV:

PSEUDO CODE EXAMPLE IV

```
public interface IParallelArray<T>
{
    int GetResultCount( );
    T GetResult(int index);
}
```

Calling GetResult(i) will trigger a computation to compute the i-th element of the output. Thus, by calling GetResult( ) for different indices from different threads, the computation can be distributed among multiple computational cores.

In one embodiment, query operators, such as query operators 310 (FIG. 3), are classified into three types or categories (e.g., AA, AB, and BB), depending on whether they accept and return parallel sequences 402(4) or parallel arrays 402(3). An operator 310 of the AA type according to one embodiment accepts a parallel array 402(3) as input and returns a parallel array 402(3) as output; an operator 310 of the AB type according to one embodiment accepts a parallel array 402(3) as input and returns a parallel sequence 402(4) as output; and an operator 310 of the BB type according to one embodiment accepts a parallel sequence 402(4) as input and also returns a parallel sequence 402(4) as output.

The following Table I provides examples of AA type query operators 310:

TABLE I

| | |
|---|---|
| Select | Projects each element by applying a user-specified projection function to each element. For example, parArray.Select(x => −x) represents a parallel array with each element equal to the corresponding element in parArray, but negated. |
| Take(N) | Takes the first N elements of a parallel array. For example, parArray.Take(10) represents a parallel array where each element is equal to the corresponding element in parArray, but the length of the array is limited to 10. |
| Reverse | Reverses a parallel array. |
| Concat(ParallelList) | Concatenates two parallel arrays. |

The following Table II provides an example of an AB type query operator 310:

TABLE II

| | |
|---|---|
| PositionalWhere | PositionalWhere only keeps element whose position in the input matches a particular predicate. For example, src.PositionalWhere(i => i%2 == 0) represents a sequence based on src where elements in odd positions have been filtered out. |

The following Table III provides examples of BB type query operators 310:

TABLE III

| | |
|---|---|
| Select | Projects each element by applying a user-specified projection function to each element. For example, src.Select(x => −x) represents a sequence with each element equal to the corresponding element in src, but negated. Note: Select according to one embodiment is both an AA and a BB type operator. |
| Where | Where only keeps elements that match a particular predicate. For example, src.Where(x => x%2==0) represents a sequence based on src where odd elements were filtered out. |
| SelectMany | SelectMany is a generalization of a Select. Select converts each element to exactly one element. SelectMany converts each element in the input into zero or more elements. SelectMany according to one embodiment performs a one-to-many projection on sequence elements |

It will be understood that additional or different operators than those listed in Tables I-III may be used, and that Tables I-III are not meant to be limiting.

State diagram 400 will now be described in further detail with reference to a couple of example queries. As a first example, consider the PLINQ query given in the following Pseudo Code Example V:

PSEUDO CODE EXAMPLE V

```
int[ ] arr = ...;
int[ ] result = arr.AsParallel( )
    .Select(x => Foo(x))
    .Take(1000)
    .Where(x => x%3 == 0)
    .ToArray( );
```

The query given in Example V is allowed by the state diagram 400. This can be confirmed by tracing the query through the state diagram 400. On the first line of Example V, an array 402(1), arr, is defined. On the second line, AsParallel( ) is applied to the array 402(1), thereby converting the array 402(1) to a parallel array 402(3), which is allowed as indicated by transition 404(2). On the third and fourth lines, AA type operators 310 are used, so the result will be a parallel array 402(3), which is allowed as indicated by transition 404(6). On the fifth line, a BB type operator 310 is used, so partitioning will happen (transition 404(5)) to generate a parallel sequence 402(4), and the output result will be a parallel sequence 402(4) (transition 404(8)). On the sixth line, ToArray( ) is called to execute the query and generate a regular array 402(1) as the output of the query.

As a second example, consider the PLINQ query given in the following Pseudo Code Example VI:

PSEUDO CODE EXAMPLE VI

```
int[ ] arr = ...;
int[ ] result =
    arr.AsParallel( )
```

```
.Where(x => x%3 == 0)
.Take(1000)
.ToArray( );
```

The query given in Example VI is not allowed by the state diagram 400, because the output of the BB type Where( ) operator is a parallel sequence 402(4), but the Take( ) operator is an AA type operator 310, which is applied to parallel arrays 402(3), and there is no transition 404 from a parallel sequence 402(4) to a parallel array 402(3). In one embodiment, the compiler 312 (FIG. 3) would throw an error or generate a prohibited query indication 316 if the user wrote this query. The indication 316 according to one embodiment indicates that the query would not be efficiently executed in parallel.

Figure 5:
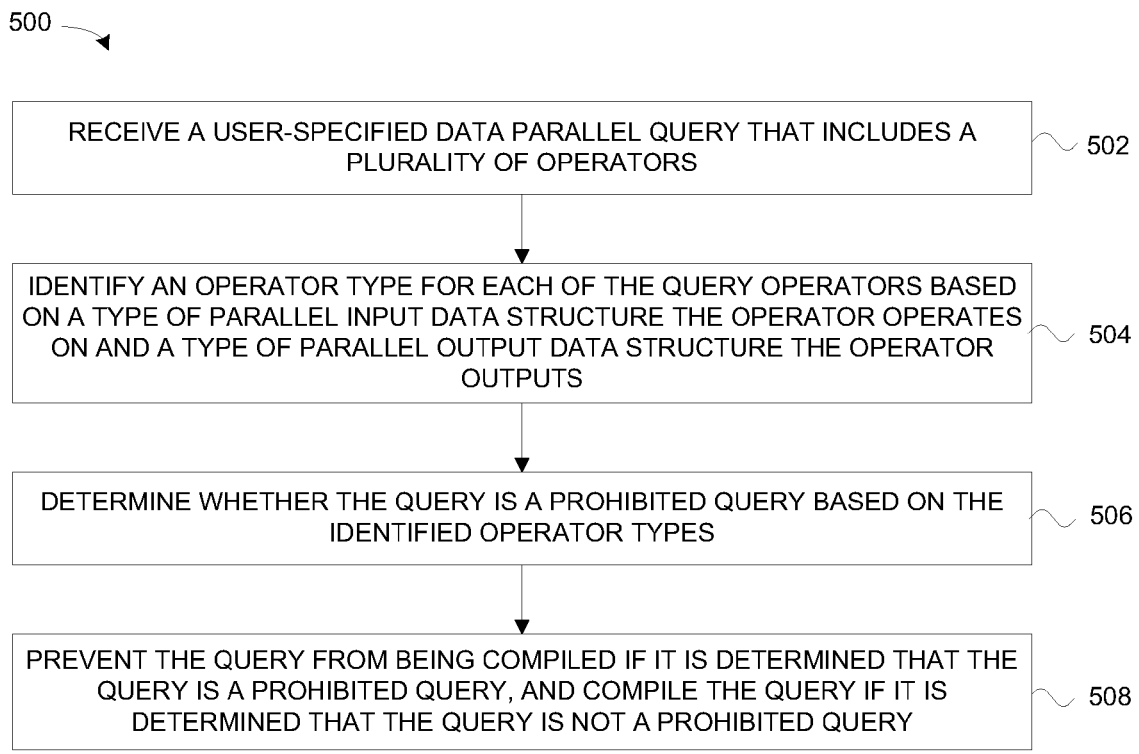
FIG. 5 is a flow diagram illustrating a method of analyzing a data parallel query according to one embodiment.

FIG. 5 is a flow diagram illustrating a method 500 of analyzing a data parallel query 308 according to one embodiment. At 502 in method 500, a user-specified data parallel query 308 that includes a plurality of query operators 310 is received. In one embodiment, the received query 308 is a language integrated query.

At 504, an operator type for each of the query operators 310 is identified based on a type of parallel input data structure the operator 310 operates on and a type of parallel output data structure the operator 310 outputs. In one embodiment, the type of parallel input data structure and the type of parallel output data structure for each operator 310 are each one of a parallel array 402(3) type of data structure and a parallel sequence 402(4) type of data structure. In one embodiment, the parallel array 402(3) type of data structure comprises an interface including a first method for providing indexed access to elements in the data structure, and a second method for obtaining a count value representing a total number of elements in the data structure. The parallel sequence 402(4) type of data structure according to one embodiment comprises an interface including a method for partitioning the data structure into a plurality of partitions and enumerating through the plurality of partitions with a plurality of enumerators.

The parallel array 402(3) type of data structure and the parallel sequence 402(4) type of data structure according to one embodiment are each "lazy" data structures. A "lazy" data structure according to one embodiment is a structure in which the elements are computed on-demand (as opposed to "eagerly"). For example, in one embodiment, when an element of a lazy data structure is first accessed, the element is computed at that time; and if the element is accessed again later, the element is recomputed at that time. In one embodiment, elements that have already been computed may be stored in memory to avoid re-computing these elements.

At 506 in method 500, it is determined whether the query 308 is a prohibited query 316 based on the identified operator types. In one embodiment, the operator types include a first operator type configured to operate on the parallel array 402 (3) type of data structure and output the parallel array 402(3) type of data structure. Operators 310 of the first operator type according to one embodiment include at least one of a Select operator configured to perform a projection on array elements, a Take operator configured to take a user-specified number of array elements, a Reverse operator configured to reverse positions of array elements, and a Concatenate operator configured to concatenate two parallel arrays. In one embodiment, the operator types further include a second operator type configured to operate on the parallel sequence 402(4) type of data structure and output the parallel sequence 402(4) type of data structure. Operators 310 of the second operator type according to one embodiment include at least one of a Select operator configured to perform a projection on sequence elements, a Where operator configured to keep sequence elements that match a user-specified predicate, and a SelectMany operator configured to perform a one-to-many projection on sequence elements. In one embodiment, the operator types further include a third operator type configured to operate on the parallel array 402(3) type of data structure and output the parallel sequence 402(4) type of data structure. Operators 310 of the third operator type according to one embodiment include a PositionalWhere operator configured to keep array elements whose position matches a user-specified predicate.

At 508 in method 500, the query 308 is prevented from being compiled if it is determined at 506 that the query 308 is a prohibited query 316, and the query 308 is compiled if it is determined at 506 that the query 308 is not a prohibited query 316.

Figure 6:
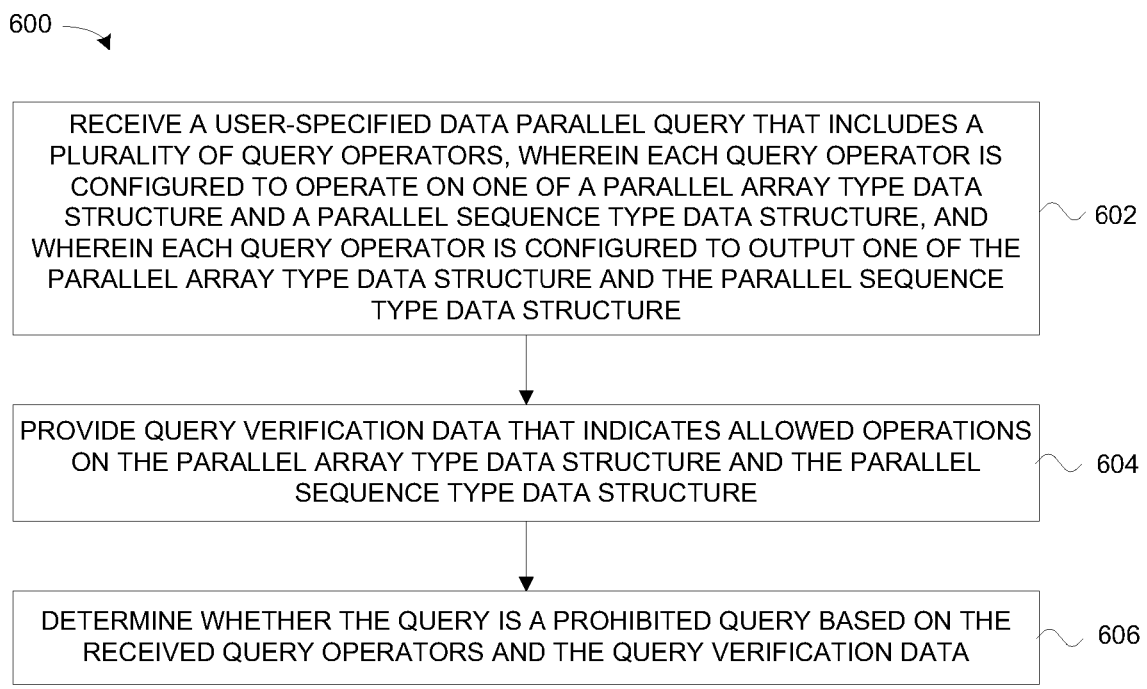
FIG. 6 is a flow diagram illustrating a method of analyzing a data parallel query according to another embodiment.

FIG. 6 is a flow diagram illustrating a method 600 of analyzing a data parallel query 308 according to another embodiment. At 602, a user-specified data parallel query 308 that includes a plurality of query operators 310 is received, wherein each query operator 308 is configured to operate on one of a parallel array 402(3) type data structure and a parallel sequence 402(4) type data structure, and wherein each query operator 310 is configured to output one of the parallel array 402(3) type data structure and the parallel sequence 402(4) type data structure. At 604, query verification data 302 is provided that indicates allowed operations on the parallel array 402(3) type data structure and the parallel sequence 402(4) type data structure. At 606, it is determined whether the query 308 is a prohibited query 316 based on the received query operators 310 and the query verification data 302.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of analyzing a data parallel query, comprising:
receiving a user-specified data parallel query that includes a plurality of query operators;
identifying an operator type for each of the query operators based on a type of parallel input data structure the operator operates on and a type of parallel output data structure the operator outputs, wherein each of the type of parallel input data structure and the type of parallel output data structure for each operator is one of a parallel array type of data structure and a parallel sequence type of data structure;
providing query verification data that indicates allowed operations on the parallel array type of data structure and the parallel sequence type of data structure; and
determining, using a processor, whether the user-specified data parallel query is a prohibited query based on the identified operator types and the query verification data.

2. The method of claim 1, wherein the parallel array type of data structure and the parallel sequence type of data structure are lazy data structures.

3. The method of claim 1, wherein the parallel array type of data structure comprises an interface including a first method for providing indexed access to elements in the data structure.

4. The method of claim 3, wherein the interface includes a second method for obtaining a count value representing a total number of elements in the data structure.

5. The method of claim 1, wherein the parallel sequence type of data structure comprises an interface including a method for partitioning the data structure into a plurality of partitions and enumerating through the plurality of partitions with a plurality of enumerators.

6. The method of claim 1, wherein the identified operator types include a first operator type configured to operate on the parallel array type of data structure and output the parallel array type of data structure.

7. The method of claim 6, wherein operators of the first operator type include at least one of the following: a Select operator configured to perform a projection on array elements, a Take operator configured to take a user-specified number of array elements, a Reverse operator configured to reverse positions of array elements, and a Concatenate operator configured to concatenate two parallel arrays.

8. The method of claim 6, wherein the identified operator types further include a second operator type configured to operate on the parallel sequence type of data structure and output the parallel sequence type of data structure.

9. The method of claim 8, wherein operators of the second operator type include at least one of the following: a Select operator configured to perform a projection on sequence elements, a Where operator configured to keep sequence elements that match a user-specified predicate, and a SelectMany operator configured to perform a one-to-many projection on sequence elements.

10. The method of claim 8, wherein the identified operator types further include a third operator type configured to operate on the parallel array type of data structure and output the parallel sequence type of data structure.

11. The method of claim 10, wherein operators of the third operator type include a PositionalWhere operator configured to keep array elements whose position matches a user-specified predicate.

12. The method of claim 1, and further comprising:
preventing the user-specified data parallel query from being compiled if it is determined that the user-specified data parallel query is a prohibited query.

13. The method of claim 1, wherein the user-specified data parallel query is a language integrated query.

14. A computer-readable storage medium storing computer-executable instructions for performing a method, comprising:
receiving a user-specified data parallel query that includes a plurality of query operators, each query operator configured to operate on one of a parallel array type data structure and a parallel sequence type data structure, and each query operator configured to output one of the parallel array type data structure and the parallel sequence type data structure;
providing query verification data that indicates allowed operations on the parallel array type data structure and the parallel sequence type data structure; and
determining whether the user-specified data parallel query is a prohibited query based on the received query operators and the query verification data.

15. The computer-readable storage medium of claim 14, wherein the parallel array type data structure comprises an interface including a first method for providing indexed access to elements in the parallel array type data structure.

16. The computer-readable storage medium of claim 15, wherein the interface includes a second method for obtaining a count value representing a total number of elements in the parallel array type data structure.

17. The computer-readable storage medium of claim 14, wherein the parallel sequence type data structure comprises an interface including a first method for partitioning the parallel sequence type data structure into a plurality of partitions and enumerating through the plurality of partitions with a plurality of enumerators.

18. The computer-readable storage medium of claim 14, wherein the user-specified data parallel query is a language integrated query.

19. A method of analyzing a data parallel query, comprising:
receiving a user-specified data parallel query that includes a plurality of query operators;
identifying an operator type for each of the query operators based on a type of parallel input data structure the operator operates on and a type of parallel output data structure the operator outputs, wherein each of the type of parallel input data structure and the type of parallel output data structure for each operator is one of a parallel array type of data structure that provides indexed access to elements in the data structure and a parallel sequence type of data structure that provides enumerator access to elements in the data structure;
providing query verification data that indicates allowed operations on the parallel array type of data structure and the parallel sequence type of data structure; and
determining, using a processor, whether the user-specified data parallel query is a prohibited query based on the identified operator types and the query verification data.

* * * * *